A. J. & H. LINEBARGER.
Grain Separator.
No. 56,237. Patented July 10, 1866.
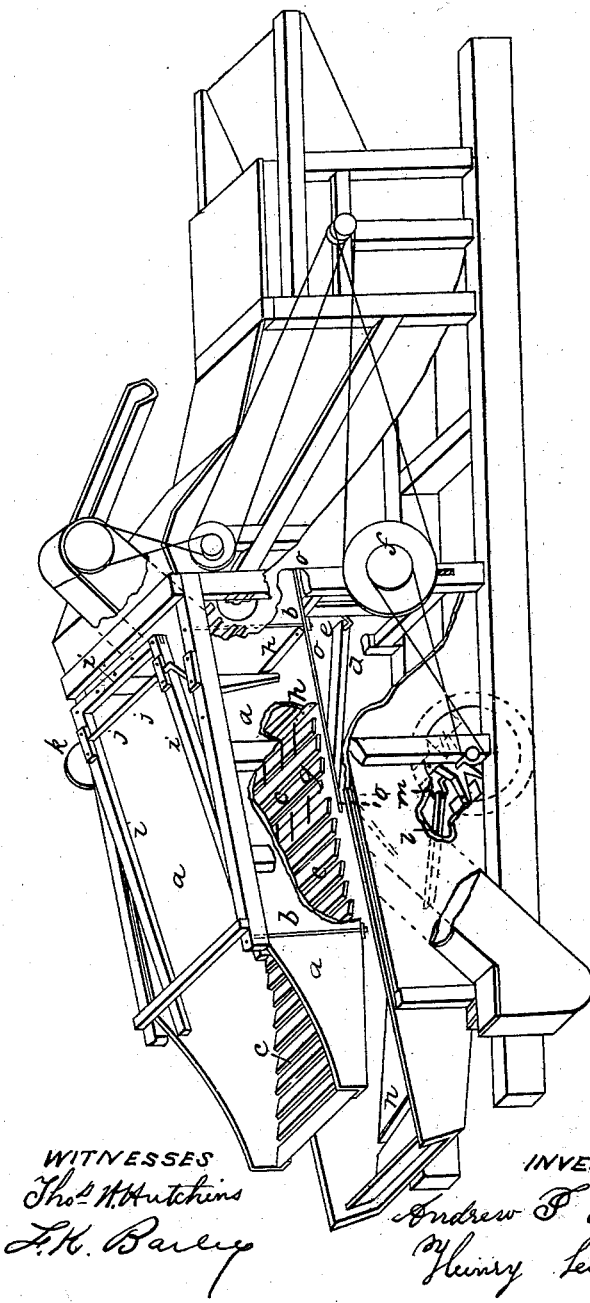
WITNESSES
Thos. H. Hutchins
F. K. Bailey
INVENTORS
Andrew J. Linebarger
Henry Linebarger

UNITED STATES PATENT OFFICE.

ANDREW J. LINEBARGER AND HENRY LINEBARGER, OF JACKSON, ILLINOIS.

IMPROVEMENT IN GRAIN-SEPARATORS.

Specification forming part of Letters Patent No. 56,237, dated July 10, 1866.

*To all whom it may concern:*

Be it known that we, ANDREW J. LINEBARGER and HENRY LINEBARGER, of the town of Jackson, in Will county, and State of Illinois, have invented a new and useful Improvement on a "Grain-Separator," commonly so called; and we do hereby declare that the following is a full, clear, and exact description of the construction and operation of the same, reference being had to the annexed drawing, making a part of this specification.

To enable others skilled in the art to make and use our invention, we will proceed to describe its construction and operation.

We construct the main frame of our separator in the ordinary manner, with the ordinary shafts, pulleys, aprons, &c., except as to such as we will now particularly designate and describe.

In place of the endless apron ordinarily used to carry off the straw and separate the grain therefrom, we substitute the hanging vibrating shaker, marked $a$, which said shaker is suspended by a hanging rod at each corner, marked $b$, attached to the main frame at the upper end thereof.

Near the bottom, and running across the shaker $a$, we place the inclined slats $c$, far enough apart to admit the passage of the grain to the sieves, and an inclined floor, $o$, running from the front end of the shaker to the center thereof on a sufficient descent to conduct what grain may fall thereon to the sieve-shaker $n$.

We produce the vibrating motion of the shaker $a$ by the connecting-rod $d$, attached to the crank-shaft $e$, which is made to revolve by the pulley $f$, said connecting-rod being attached to the said shaker at the center of the bottom thereof.

We also, for the purpose of more thoroughly shaking the grain out of the straw, use the vibrating rake-heads $g$, placed near to and over the slats $c$, said rake-heads being furnished with pawls $h$ at the outer ends, operating against the main frame as the shaker vibrates, causing the rake-heads to toss the straw up and down.

We also use the revolving rake $i$, attached to the crank-shaft $j$, which is made to revolve by the pulley $k$, for the purpose of carrying the straw over the slats off the back end of the shaker.

We also use the connecting-rod $l$, attached to the crank-fan shaft $m$ at the center thereof, and attached to the center of the sieve-shaker $n$ at the other end, for the purpose of giving a vibrating motion to said shaker.

What we claim as our invention, and desire to secure by Letters Patent, is—

The shaker $a$, in combination with the rake-heads $g$, constructed and operating substantially as described.

ANDREW J. LINEBARGER.
   HENRY LINEBARGER.

Witnesses:
 THOS. H. HUTCHINS,
 F. K. BAILEY.